United States Patent [19]

Hayek

[11] Patent Number: 5,181,372

[45] Date of Patent: Jan. 26, 1993

[54] SUPPORT FOR MOUNTING AN IMPLEMENT ENGINE AND SUPPORTING ITS CRANKSHAFT

[75] Inventor: James S. Hayek, Racine, Wis.

[73] Assignee: Textron Inc., Providence, R.I.

[21] Appl. No.: 731,861

[22] Filed: Jul. 16, 1991

[51] Int. Cl.$^5$ .............................................. A01D 75/18
[52] U.S. Cl. ...................................... 56/17.4; 56/17.5; 56/320.1; 56/DIG. 24
[58] Field of Search ............... 56/255, 295, 16.7, 17.5, 56/320.1, DIG. 20, DIG. 24, 17.4

[56] References Cited

U.S. PATENT DOCUMENTS

| | | | |
|---|---|---|---|
| 2,720,071 | 10/1955 | Watanabe | 56/25.4 |
| 2,878,633 | 3/1959 | Mullin | 56/255 |
| 3,890,773 | 6/1975 | Frost | 56/255 |
| 3,967,438 | 7/1976 | Tombers | 56/17.5 X |
| 4,205,737 | 6/1980 | Harkness | 192/17 |
| 4,731,981 | 3/1988 | Geringer | 56/17.5 |
| 4,738,089 | 4/1988 | Smucker et al. | 56/255 |

*Primary Examiner*—Terry Lee Melius
*Attorney, Agent, or Firm*—Arthur J. Hansmann

[57] ABSTRACT

A support for mounting an implement engine onto an implement and supporting the engine crakshaft which has an extending end. The support is attached to the engine base and presents a rotation support for the engine shaft and presents an additional rotation support for the implement tool. The support serves the dual purpose of resisting shaft bending and providing a simplified attachment for the engine on the implement.

15 Claims, 1 Drawing Sheet

SUPPORT FOR MOUNTING AN IMPLEMENT ENGINE AND SUPPORTING ITS CRANKSHAFT

This invention pertains to a support for mounting an implement engine, and more particularly, it pertains to a combined engine mounting and radial support for the engine crankshaft.

BACKGROUND OF THE INVENTION

In various types of implements, particularly in lawn mowers with rotary blades, there is concern with regard to mounting the engine on the implement housing and with regard to the bending of the engine crankshaft when the implement, such as the rotating blade, strikes an object. The prior art includes several constructions pertaining to this problem, such as having the rotating blade slip on its drive mounting when an object is impacted, and also radially supporting the extending end of the engine crankshaft, where it extends beyond the remainder of the engine, to thereby minimize radial bending of the crankshaft upon impact.

U.S. Pat. Nos. 3,890,773 and 4,738,089 are concerned with the problem of the bending of the engine crankshaft upon impact, and those patents therefore show arrangements whereby the crankshaft extending end is radially supported to minimize the bending. They also show arrangements, though different from the present invention, for mounting the engine onto the implement, and with the mounting member providing the radial support for the crankshaft extending end.

U.S. Pat. No. 4,205,737 shows only an engine mounting on a mower, and no bearing supports. U.S. Pat. No. 2,720,071 shows another example of an arrangement of a part, beyond the engine itself, which presents a rotation bearing which receives and rotatably supports the engine shaft. In that instance, the support member is on the mower housing which simply accommodates the entry of the shaft relative to the mower housing, and the support extends into the housing and provides the rotational bearing for that shaft extension. There is no separate part which attaches directly to the engine base or the like and which also presents the rotation support for the shaft extension, all in one unit which can then be mounted onto the implement itself, as in the present invention.

The present invention further distinguishes from the prior art in that it provides for a member which mounts directly to the engine base and which presents the shaft extension with a rotational support and which provides maximum radial strength against bending of the shaft extension upon impact. Further, the present invention provides for assembling the aforesaid engine and attached member with the implement itself so that a maximized sturdy assembly is provided and one which is of a universal nature to accommodate present-day commercial engines which are arranged for mounting on implements, such as rotary lawn mowers.

Still further, the aforementioned objects and advantages are achieved in an assembly wherein the rotating tool, such as the lawn mower blade, is frictionally driven by the engine shaft so that there will be nominal slipping upon impact. To achieve this, the friction drive parts are concentric and thereby permit close tolerances and promote the practicality of assembly of the parts.

Also, the arrangement for supporting the shaft against bending upon impact is such that the support is extended to the very limit of location adjacent the plane of rotation of the cutting blade itself, and thus there is only a minimal of extension beyond the support for a minimal of bending moment acting upon the shaft.

Other objects and advantages will be apparent upon reading the following description in light of the accompanying drawings.

DETAILED DESCRIPTION OF THE PREFERRED EMBODIMENT

Figure 2:
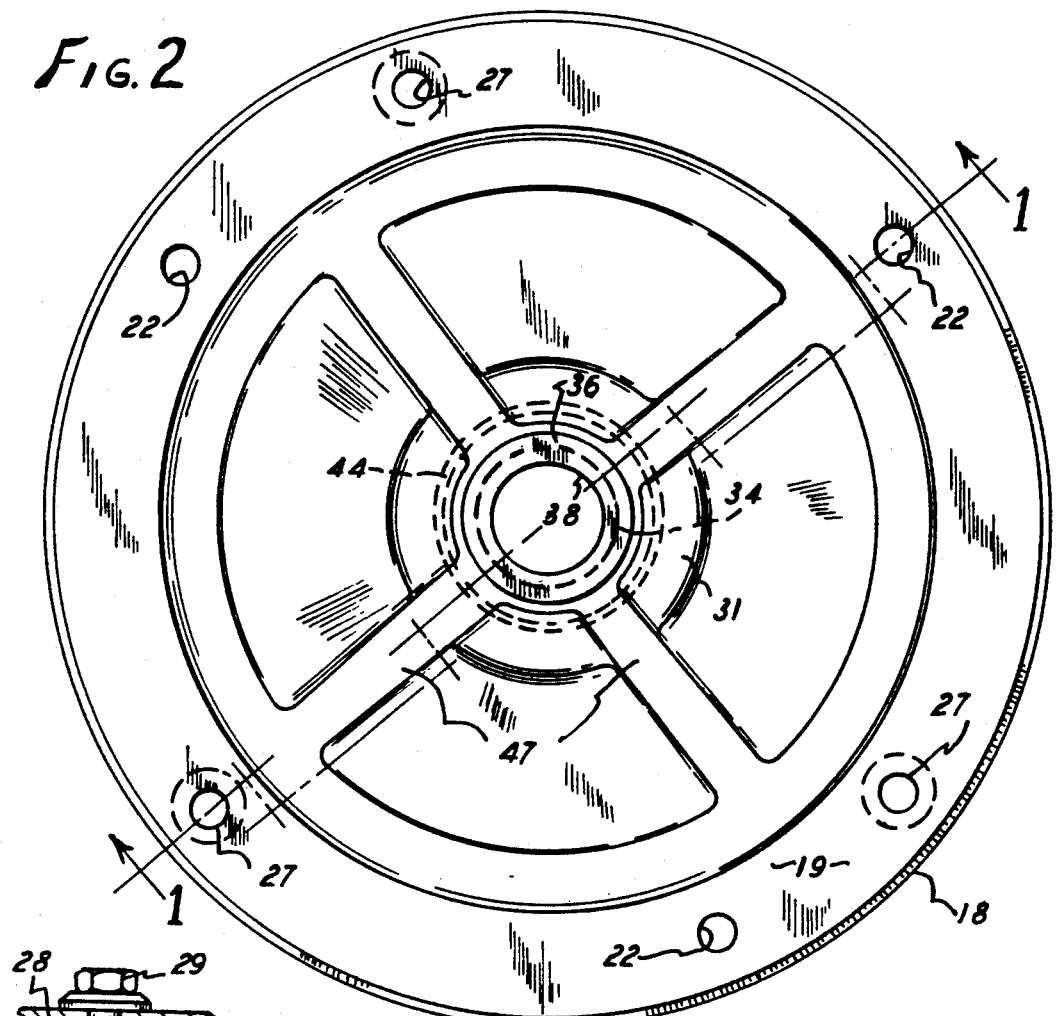
FIG. 2 is a top plan view of FIG. 1, with the engine removed.
Figure 1:
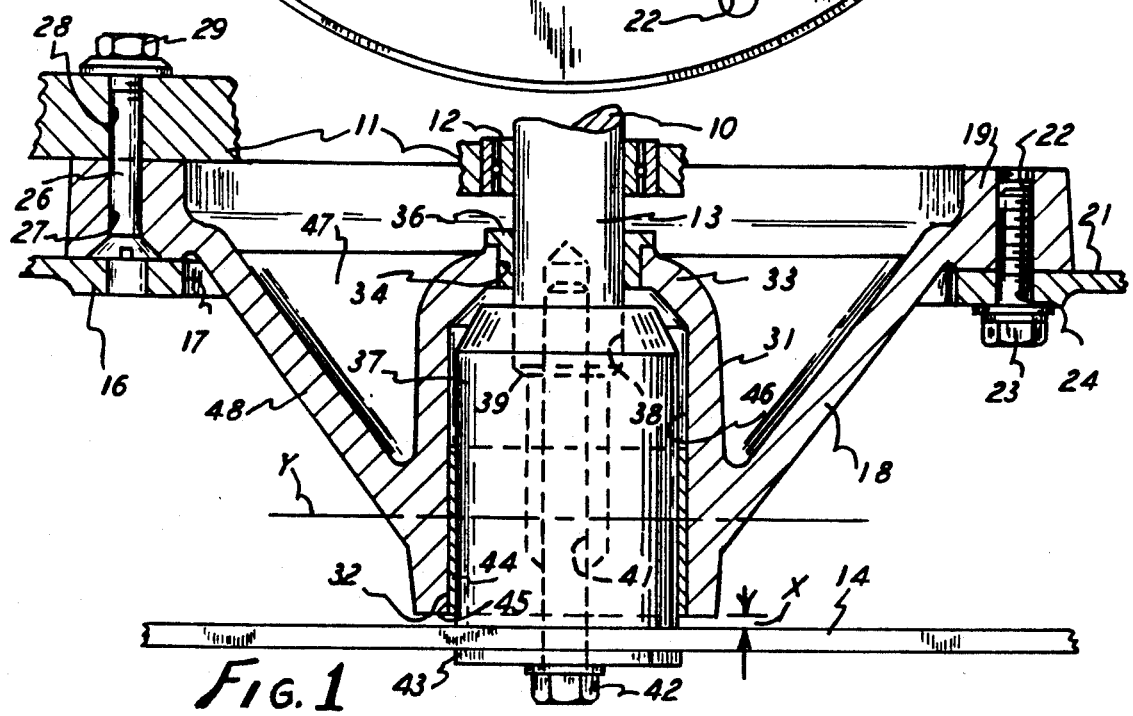
FIG. 1 is a sectional view of a preferred embodiment of this invention, and showing a fragment of the engine related thereto and with the view being taken along the line 1—1 of FIG. 2.

FIG. 1 of the drawings, for simplicity and also clarity of disclosure, is taken only substantially along the irregular line 1—1 of FIG. 2. Also, the engine fragments shown in FIG. 1 are of a conventional engine, and they are omitted in FIG. 2. FIG. 1 shows the engine shaft 10 and its usual base portion 11 and its usual ball bearing 12. The engine shaft 10 is shown to have its distal end 13 extend downwardly and beyond the remainder of the engine, in the conventional manner. That arrangement of course presents the problem for supporting the shaft 10 against bending due to impact by the implement's tool, such as a rotary cutter bar 14 which is connected to the shaft 10 in a manner described later. Also, in addition to resisting the bending of shaft 10, the present invention provides for mounting the engine on an implement housing, such as a rotary mower housing 16 which is fragmentarily shown but which presents an opening 17 through which the shaft 10 can project, as shown. In further considering the mounting of the engine 11 on the implement housing 16, a mounting member 18, herein referred to as a cage, surrounds the shaft distal end 13 and extends radially outwardly to a flange circular ring 19 which rests on the implement housing top surface 21. The ring 19 is shown to have three threaded holes 22 which aligned with three holes in the implement housing 17 so that a screw 20 can extend through each of the aligned pair of holes and thus fixedly mount the cage 18 onto the implement housing 16.

With that arrangement, the mounting is achieved through utilization of the conventionally provided holes 24 in the implement housing 16, and no special working, mounting, or the like is required for attaching the engine to the implement.

However, prior to mounting the cage 18 onto the implement 16, the engine itself is bolted to the cage 18, and this is by bolts 26 extending through an additional set of holes 27 in the cage ring 19 and also extending through holes 28 in the engine base 11. Of course a nut 29 secures the cage 18 and the engine with its base 11 in attached relationship. That is, that the cage 18 is bolted beneath the engine base 11, such as by means of three bolts 26 extending through holes 27 in FIG. 2. In this manner, there is one set of holes 22 and 24 for mounting the cage 18 onto the implement 16, and there is a second set of holes 27 and 28 for initially attaching the cage 18 to the engine base 11 by means of the three bolts 26. Again, in this arrangement, the cage 18 becomes a fixed part of the engine itself prior to mounting the assembled cage and engine onto the implement 16.

The arrangement is such that the heretofore described mounting differs from that shown in U.S. Pat. No. 4,738,089 where concentric rings are employed in mounting the engine and a stiffener member.

The cage 18 includes a generally cylindrical central portion 31 which has a cylindrically open bottom 32 and a conical or dome-shaped top 33. The portion 33 has a circular opening 34 which receives a shouldered bronze or like bearing 36 through which the engine shaft 10 projects and in which the shaft is rotatably supported. A cylindrically shaped adaptor 37 surrounds the shaft distal end 13 by receiving the end in a circular opening 38 in the upper end of the adaptor 37. A shaft 10 and the adaptor 37 are axially shouldered at 39, as shown. Also, the adaptor 37 has a central opening 41 extending the axial length thereof for receiving a screw 42 which extends through the adaptor 37 and is threaded into the shaft distal end 13. A friction type washer or the like 43 is interposed between the head of the screw 42 and the mower blade 14 such that, upon tightening the screw 42, the shaft 10 and adaptor 37 and blade 14 all rotate as one unit in normal operation. Also, when the bar 14 impacts an obstacle, there can be some rotational slippage between the assembly of the shaft 10 and adaptor 13 and the bar 14, all to minimize damage, but that function is also disclosed in U.S. Pat. No. 4,738,089 where a frictional type mounting is employed.

However, an innovative feature beyond that shown in the aforesaid patent, is that the shown arrangement has the ring portion 45 of the cage 18 extending to a location immediately adjacent the plane of the cutter blade 14, for providing only a minimum clearance designated X. This, of course, means that the radial support for the rotating assembly, which includes the adaptor 37, is as close as reasonably possible to the rotating blade 14 and is in effect substantially in the rotational plane of the cutter bar in that there is no member intervening between the surface 45 and the cutter bar 14.

Also, it will be seen that there is a cylindrical rotation bearing 44 interposed between the circumference of the adaptor 37 and the internal cylindrical surface 46 of the cage central portion 31. Therefore, there are two spaced-apart bearings 36 and 44 which rotatably support the shaft 10. Another significant feature is that the cage 18 is machined with its opening 34 to have the bearing 36, which is in direct contact with the shaft 10, concentric to the bearing 44 for the adaptor 37. The crankshaft bearing 36 therefore pilots the cage 18 and allows installation of the adaptor 37. In this way, precise control of run-out between the top bushing or bearing 36, the engine crankshaft 10, and the adaptor 37 and its bearing or bushing 44, is achieved.

Also, the dome 33 of the cage 18, along with the bearing 36, provides for a dirt-free enclosure for the shaft distal end 13 and the adaptor 37, down to the location of the cage annular surface 45.

To insure strength and stability of the entire arrangement, the cage 18 has four webs 47 radially spaced therearound and extending integrally from the central portion 31 to the outer ring 19, particularly as shown in FIG. 2. Cage 18 therefore has a conical portion 48 integral with the ring 19 and the central cylindrical portion 31, and it extends down to a location where it intersects the intermediate axial length of the bearing 44, that is, on the line designated Y. This renders the entire assembly completely sturdy and supportive against bending of the shaft 10.

The drawings show the mower housing opening 17 to be slightly smaller than the flange 19 of the mounting member 18. Thus the flange 19, being circular, rests downwardly on the mower deck upper surface 21 and is secured thereto by the screws 23. In the relationship and assembly, the conical portion 48 of the member 18 thus is small enough to be inserted downwardly through the mower circular opening 17 to the assembled position shown in FIG. 1. That is, the entire one-piece cage 18 can be assembled onto the engine crankshaft 13 before the assembly is made with the mower deck 16. In that manner, the entire mounting member 18, along with the adaptor 37 and the bearings 36 and 44 are all assembled prior to inserting the assembly through the opening 17. Of course the mower blade 14 is then secured to the adaptor 37, and the entire assembly, including the mower 16 is then completed and no further assembly is required underneath the mower deck 16.

What is claimed is:

1. A support for mounting an implement engine and supporting its crankshaft which has an extending end, comprising an adaptor connected to the crankshaft extending end and being concentric therewith and rotatable therewith, a one-piece cage surrounding said adaptor and effecting a rotation support thereto, an additional crankshaft rotation support on said cage and spaced from the first-mentioned said rotation support to thereby, along with the first-mentioned rotation support, rotationally support said crankshaft extending end at two spaced-apart locations therealong, and said cage including a mounting portion disposed radially outwardly from said adaptor and having mounting holes for fixedly mounting the engine onto said cage and for fixedly mounting said cage onto the implement.

2. The support for mounting an implement engine and supporting its crankshaft, as claimed in claim 1, wherein said mounting holes exist in two different sets of holes whereby the engine can be mounted onto said cage prior to mounting said cage on top of the implement by positioning said cage downwardly through an opening in the implement.

3. The support for mounting an implement engine and supporting its crankshaft, as claimed in claim 1, wherein said adaptor and said cage are cylindrically shaped and concentric at their ends distal from the engine, and said distal ends extend to within substantially the same plane.

4. A support for mounting an implement engine and supporting its crankshaft, as claimed in claim 1, including a cutter bar attached to said adaptor, and the end of said rotational support on said cage at the end of said rotational support distal from said engine terminating adjacent said cutter bar, substantially in the rotational plane of said cutter bar, and being free of any intervening member between said end of said rotational support and said cutter bar.

5. A support for mounting an implement engine and supporting its crankshaft, as claimed in claim 1, said cage having a portion disposed outwardly from said rotation supports and extending to and including said mounting means, said additional rotation support having an axial length along the axis of said crankshaft extending end, and said portion being located on said cage to intersect the radial plane transverse to the axis of said additional rotation support at the intermediate axial length of said additional rotation support.

6. A support for mounting an implement engine and supporting its crankshaft which has an extending end, comprising a cage having a dome-shaped portion surrounding the extending end of said crankshaft and presenting a hollow interior, said cage presenting a radial support to said crankshaft on the dome portion of said cage, an adaptor disposed in said dome-shaped portion of said cage for rotation with said crankshaft, and said adaptor presenting an additional crankshaft radial support at a location spaced from the first-mentioned said radial support, and said cage having means for mounting onto the engine and for mounting onto the implement.

7. A support for mounting an implement engine and supporting its crankshaft, as claimed in claim 6, said cage having a portion disposed outwardly from said radial supports and extending to and including said mounting means, said additional radial support having an axial length along the axis of said crankshaft extending end, and said portion being located on said cage to intersect the radial plane transverse to the axis of said additional radial support at the intermediate axial length of said additional radial support.

8. A support for mounting an implement engine and supporting its crankshaft, as claimed in claim 6, wherein said adaptor and said cage are cylindrically shaped and concentric at their ends distal from the engine, and said distal ends extend to within substantially the same plane.

9. A support for mounting an implement engine and supporting its crankshaft, as claimed in claim 6, including a cutter bar attached to said adaptor, and the end of said radial support on said cage at the end of said radial support distal from said engine terminating adjacent said cutter bar, substantially in the rotational plane of said cutter bar, and being free of any intervening member between said end of said radial support and said cutter bar.

10. A support for mounting an implement engine and supporting its crankshaft, as claimed in claim 6, wherein said mounting means includes holes in said cage existing in two different sets whereby the engine can be mounted onto said cage prior to mounting said cage onto the implement.

11. A support for mounting an implement engine and supporting its crankshaft, as claimed in claim 6, wherein both said radial supports present a rotation bearing, and said first-mentioned radial support is arranged to be concentric with said additional crankshaft radial support for piloting said cage and thereby facilitating the location of said adaptor.

12. A support for mounting an implement engine and supporting its crankshaft, as claimed in claim 1, wherein both said rotation supports present a rotation bearing, and said first-mentioned rotation support is arranged to be concentric with said additional crankshaft rotation support for piloting said cage and thereby facilitating the location of said adaptor.

13. A support for mounting an implement engine and supporting its crankshaft which has an extending end, comprising an implement having a deck with an opening therein, an adaptor connected to the crankshaft extending end and being concentric therewith and rotatable therewith, a cage having a cylindrical portion surrounding and being available to rotationally support said adaptor and being insertable through said opening, a flange included in said cage and having a first surface for resting on said deck and having a second surface for upwardly supporting said engine, the said two surfaces being parallel to each other and respectively defining lower and upper extents of said flange, said flange having a first set and a second set of mounting holes extending through said surfaces and with said two sets being axially offset with respect to each other, threaded fasteners extending in said first set of said holes for respectively attaching said engine on said flange in contact with said second surface to constitute an assembly of said engine and said cage, and additional threaded fasteners extending in said second set of said holes for respectively attaching said assembly onto said deck with said first surface upwardly supported on said deck, and frusto-conically shaped portion included in said cage and extending upwardly and outwardly relative to the axis of said crankshaft and from said cage cylindrical portion to said flange.

14. The support for mounting an implement engine and supporting its crankshaft as claimed in claim 13, wherein said cylindrical portion including two cylindrical lengths spaced apart along the axis of said extending end of said crankshaft for separate rotational support of said crankshaft.

15. The support for mounting an implement engine and supporting its crankshaft as claimed in claim 14, wherein one of said two cylindrical lengths is located for piloting said cage onto said engine and for locating said cage and said engine on said deck.

* * * * *